Patented Oct. 16, 1951

2,571,251

UNITED STATES PATENT OFFICE 2,571,251

POLYMERIC CARBOXY AMIDE COMPOUNDS AND PROCESSES FOR THEIR PRODUCTION

Wilford Donald Jones, Cresaptown, Md., assignor to Celanese Corporation of America, a corporation of Delaware No Drawing. Application July 20, 1946,
Serial No. 685,245

2 Claims. (Cl. 260—78)

This invention relates to new organic compounds and processes for their production and is more particularly concerned with the production of linear polymeric materials suitable for example for the production of plastic materials, films, or for filament or fiber-formation.

An object of this invention is the production of novel synthetic linear polymeric compounds by the condensation of bi- or multi-functional compounds capable of forming long chain, high molecular weight linear condensation products containing carboxyamide groups as well as sulfone or keto groups in the structural units comprising said condensation products.

Other objects of this invention will appear from the following detailed description.

I have found that very valuable polymers may be produced by condensing a dicarboxylic acid containing one or more sulfone groups in its chain with a compound containing two primary amino groups. The sulfone group appears to increase the attraction between the molecules, and hence raises the melting points of the polymer as compared with the corresponding body produced from the same amino compound and the same dicarboxylic acid without the sulfone group. I have further found that polymers of still more valuable properties may be produced by condensing a dicarboxylic acid containing one or more sulfone groups with a basic compound containing two primary amino groups and one or more secondary amino groups. In the most advantageous form of the invention a dicarboxylic acid containing one or more sulfone groups is condensed with a polyamine containing two primary amino groups and a number of secondary amino groups equal to the number of sulfone groups in the dicarboxylic acid, the two reagents being further characterized that the secondary amino group or groups in the polyamine bear the same positional relationship to the primary amino groups as the sulfone groups do to the carboxylic acid groups in the other reagent. Thus, for instance, if the structure of the dicarboxylic acid be such that there are two carbon atoms between the sulfone group and each of the carboxylic groups, then an appropriate amine would be diethylene triamine.

The sulfone dicarboxylic acids for use according to the present invention may be made by a number of methods. For example, mono sulfone dicarboxylic acids may be produced by first condensing two molecules of an ω-halogen carboxylic acid, or salt, ester or nitrile thereof, with an alkali metal sulfide, for example sodium or potassium sulfide, and then oxidizing the resulting thioether to the sulfone before or after hydrolysis of any ester or nitrile group to the corresponding dicarboxylic acid, if this is required. The same type of mono sulfone dicarboxylic acid may be produced by condensing one mole of ω-halogen carboxylic acid, or salt, ester or nitrile thereof with a salt, preferably an alkali metal salt, of an ω-mercapto carboxylic acid or ester or nitrile, and then oxidizing and, if necessary, hydrolyzing as before.

The oxidation may be carried out for example with hydrogen peroxide, permanganate, or the like. Preferably, such ω-halogen carboxylic acid has the same number of atoms between the carboxylic group and the halogen group as has the ω-mercapto carboxylic acid between its terminal groups. The sulfone group is thus symmetrically placed between the two carboxylic acid groups. Indeed it may be stated generally that according to the present invention, no matter whether the dicarboxylic acid has one, two or more sulfone groups it is preferably symmetrical about its central point and in the preferred form of the invention, the polyamine to be used with it is likewise symmetrical about its central point.

Dicarboxylic acids containing two sulfone groups may be produced either by condensing two moles of an ω-halogen carboxylic acid, or salt, ester or nitrile thereof, with one mole of an alkali metal salt of a dimercaptan or by condensing two moles of the sodium salt of an ω-mercapto carboxylic acid or ester or nitrile thereof with one molecule of a dihalide, for example, an α-ω-paraffin dihalide. Having formed the thioether, the sulfone is obtained as before by simple oxidation. Both these reactions lead automatically to disulfone dicarboxylic acids in which the symmetry referred to above obtains.

Again β-β'-sulfone dipropionic acid may be produced by simple addition of two moles of acrylonitrile to one of hydrogen sulfide, followed by oxidation and hydrolysis in either order. Similarly disulfone β-β'-dicarboxylic acids may be produced by addition of two moles of acrylonitrile to one mole of a dimercaptan, again followed by oxidation and hydrolysis.

β-β'-sulfone dipropionic acid has already been mentioned as a suitable monomer for the purpose of the present invention. Other sulfone dicarboxylic acids include γ-γ'-sulfone dibutyric acid, δ-δ'-sulfone divaleric acid and homologues thereof. The invention, however, is not confined to bodies of the type containing only methylene groups in addition to the polar groups specifically mentioned, but includes compounds having between the polar groups substituted alkylene chains, particularly alkyl substituted alkylene chains, and arylene residues, e. g. phenylene. Thus, for example, I may use diphneyl sulfone 4-4' dicarboxylic acid, and in a less advantageous form of the invention, sulfone di-glycollic acid and sulfone di-lactic acid.

Suitable diamines for use within the broader scope of the invention include ethylene diamine, trimethylene diamine, tetramethylene diamine, pentamethylene diamine, hexamethylene diamine, decamethylene diamine, and the like. The polyamines which are the preferred reagents include diethylene triamine, triethylene tetramine, bis ($\beta$-amino-propyl)-amine (i. e. 1.7-diamino-4-aza-heptane), 1.9 - diamino - 5 - aza-nonane, 1.11 diamino- 6 - aza - undecane, 1.12 - diamino - 3.10-diaza-dodecane, 1.16 diamino-7.10-diaza-hexadecane and the like. As previously mentioned, it is preferred that these polyamines should be used in association with sulfone dicarboxylic acids in such a way that the distances separating the secondary amino from the primary amino groups are the same as those separating sulfone from the carboxylic acid groups, and in the case of using a tetramine with a disulfone-dicarboxylic acid, the distance separating the two sulfone groups should be the same as that separating the two secondary amino groups. Diphenyl sulfone 4.4'-dicarboxylic acid may be condensed with 4.4'-diamino diphenyl amine.

In the same way, polymers having valuable properties may be produced by condensing a dicarboxylic acid containing one or more keto groups with a polyamine containing two primary amino groups and one or more secondary amino groups. The position of the keto groups and carboxylic acid groups in relation to those of the secondary amino groups and primary amino groups is preferably similar to that discussed above for the condensation products from sulfone dicarboxylic acid and polyamines. As examples of keto dicarboxylic acids which may be used, I may instance $\gamma$-keto pimelic acid and $\delta$-keto azelaic acid. Compounds with long chains between the keto and carboxylic acid groups such as 8-keto pentadecane-1.15-dicarboxylic acid are not the preferred bodies, $\gamma$-$\gamma'$-diketo sebacic acid is an example of a diketo dicarboxylic acid which may be used. Other keto carboxylic acids include acetone dicarboxylic acid, $\beta$-keto adipic acid, and benzophenone-4.4'-dicarboxylic acid.

Instead of using the dicarboxylic acids in the free state they may be used in the form of their amide-forming derivatives, for example their esters, amides or (if water is present) nitriles. Again instead of using the amino compounds in the form of the free base, they may be used in the form of acidylated compounds with acids which are readily split off during the condensation. Thus, the formylamino compounds may be used. Further, polymers according to the present invention may be produced by reaction between a di-isocyanate and a dicarboxylic acid, either or both of which contains one or more sulfone groups.

The actual condensation between the dicarboxylic acids and the amino compounds may be carried out by simple heating, using the compounds either alone or in solution in a suitable inert solvent, for example a phenolic body, such as phenol itself, the cresols, xylenols, and the like. In order to obtain products of high molecular weight, and especially to produce polymers which are fiber-forming, the reagents should be used in substantially equi-molecular proportions. It is permissible, however, even in the case of producing highest molecular polymers to use an excess of one or other reagent amounting to one or two percent molar excess. The smaller the excess, the higher can be the molecular weight of the product. Generally, especially in the case of condensing the dicarboxylic acid with polyamines, it is desirable to use condensing conditions which are as mild as possible. Generally, the reaction between free carboxylic acid groups and free amino groups begins at temperatures of the order of 160-170° C. but in order to produce high polymers it is generally advisable to carry the temperature up, at least towards the end of the condensation, to temperatures of the order of 220-250° C. or even higher. In the case of carrying out the condensation in the absence of added solvent or diluent, it is desirable, however, to use a temperature sufficiently high to keep the reaction mixture fluid throughout the reaction. One important feature of the sulfone polymers of the present invention is the intermolecular attraction between the sulfone groups of one molecule and the amino groups carrying hydrogen atoms of another molecule, and the invention comprises broadly linear polymers having these two polar groups so as to permit this intermolecular attraction.

In order further to illustrate my invention but without being limited thereto the following examples are given:

*Example I*

*Production of $\delta$-$\delta'$-sulfone divaleric acid.*—1.4-dichloro-butane is first condensed with sodium cyanide using a sufficient excess of dichloro-butane, for example, two to four moles, to prevent substantial formation of adiponitrile. This condensation reaction is carried out in 80% aqueous alcohol at the reflux temperature over a period of twenty hours. During the reaction a substantial deposit of sodium chloride appears. The sodium chloride is filtered off and the liquid diluted with three volumes of water, which dilution causes separation of the unreacted dichloro-butane and chloro-valeronitrile. This layer is separated and the aqueous layer extracted with chloroform, the chloroform extracts being combined with the product and the whole dried over fused $CaCl_2$. The mixture is subjected to distillation and the $\delta$-chloro-valeronitrile is thereby obtained in pure form.

The $\delta$-chloro-valeronitrile is then condensed with $Na_2S.9H_2O$ by six hour reflux in 80% aqueous alcohol. A slight excess over two moles (ten mole percent) of chloro-valeronitrile is used to insure complete reaction. The product formed is isolated, after filtering off sodium chloride, by distillation of alcohol until two liquid phases appear. The mixture is extracted with chloroform, the extracts dried over fused $CaCl_2$ and the thio divaleronitrile is obtained finally by employing vacuum distillation.

The oxidation of the thioether to the sulfone is accomplished in t-butyl alcohol solution with excess 30% aqueous hydrogen peroxide at 80° C. The $\delta$-$\delta'$-sulfone divaleronitrile formed crystallizes on concentration of the solution.

Hydrolysis of the above $\delta$-$\delta'$-sulfone divaleronitrile to the desired $\delta$-$\delta'$-sulfone divaleric acid is accomplished by boiling with a five molar quantity of concentrated hydrochloric acid. The product separates on evaporation of the acid and is then purified by crystallization from boiling water.

Example II

*Production of 1.9-diamino-5-aza-nonane.*—1.4-dichloro-butane is condensed with phthalimide and potassium carbonate using a four molar excess of the dichloro-butane to limit formation of the diphthalimide. Reaction occurs at 190–200° C. during five hours. The resulting mixture is subjected to steam distillation to remove unreacted dichloro-butane. The plastic mass of mono-phthalimido-chlorobutane and diphthalimido-butane is washed with boiling water to remove phthalimide. The mass is boiled up with ether in which the diphthalimido body is insoluble. The N-($\delta$-chloro-butyl)-phthalimide is recovered by evaporation of the ether solution and finally crystallized from 80% alcohol.

The N-($\delta$-chloro-butyl)-phthalimide is condensed with 1.4-diamino-butane, using a three to five molar excess of diamine to prevent as far as possible reaction with more than one labile hydrogen of the diamino-butane. The product obtained is hydrolyzed by concentrated hydrochloric acid in an autoclave at 130° C. during four hours. Hydrolysis may also be achieved by boiling in a mutual solvent with hydrazine hydrate. Upon completion of hydrolysis, the hydrochloric acid solution is diluted and the phthalic acid removed by filtration. Addition of alcohol causes separation of the hydrochloride of the triamine. Further purification of the triamine may be achieved by decomposition of the hydrochloride with sodium hydroxide and distilling under vacuum.

Example III

*The polymerization.*—The dicarboxylic acid prepared in accordance with Example I and the triamine which is prepared as described in Example II are mixed in equi-molecular proportions (as previously determined by titration) in meta-cresol, the meta-cresol being present in approximately the same weight as the combined weight of the other two reagents. The mixture is then raised to and held at the boiling point of the meta-cresol using an air condenser to prevent escape of the meta-cresol, for three to five hours, or until the product attains the desired molecular weight as determined by its intrinsic viscosity in meta-cresol. Finally, the hot solution in meta-cresol is thrown into acetone and the precipitated polymer is then washed with acetone.

It is to be understood that the foregoing detailed description is given merely by way of illustration and that many variations may be made therein without departing from the spirit of my invention.

Having described my invention, what I desire to secure by Letters Patent is:

1. Process for the production of a polymer, which comprises condensing substantially equi-molecular proportions of $\delta$-$\delta'$-sulfone divaleric acid and 1.9-diamino-5-aza-nonane in solution in m-cresol at reflux temperature.

2. A polymer obtained by the process of claim 1.

WILFORD DONALD JONES.

REFERENCES CITED

The following references are of record in the file of this patent:

UNITED STATES PATENTS

| Number | Name | Date |
|---|---|---|
| 2,149,273 | Carothers | Mar. 7, 1939 |
| 2,176,074 | Jocobson | Oct. 17, 1939 |
| 2,191,556 | Carothers | Feb. 27, 1940 |
| 2,195,570 | Hovey | Apr. 2, 1940 |
| 2,265,127 | Bolton | Dec. 9, 1941 |
| 2,279,752 | Jacobson | Apr. 14, 1942 |
| 2,289,222 | Spanagel | July 7, 1942 |
| 2,483,513 | Allen | Oct. 4, 1949 |